April 5, 1932.                W. C. FISHER                1,852,047
                              FRICTION ELEMENT
                            Filed March 14, 1930
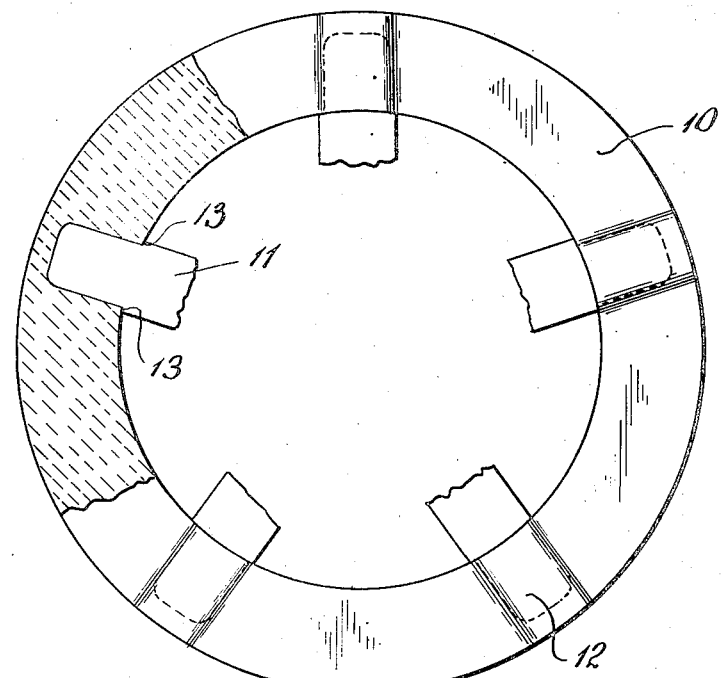
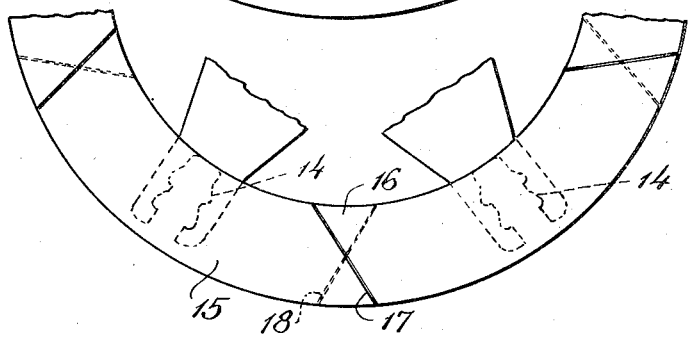
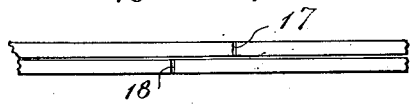
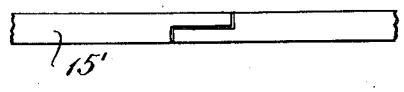
INVENTOR
William C. Fisher
BY
Pennie Davis Marvin Edmonds
ATTORNEYS Patented Apr. 5, 1932

1,852,047

UNITED STATES PATENT OFFICE

WILLIAM C. FISHER, OF MIDDLETOWN, CONNECTICUT, ASSIGNOR TO THE RUSSELL MANUFACTURING COMPANY, OF MIDDLETOWN, CONNECTICUT, A CORPORATION OF CONNECTICUT

FRICTION ELEMENT

Application filed March 14, 1930. Serial No. 435,678.

This invention relates to friction clutches of the type now used in automobiles and other motor driven vehicles and is concerned more particularly with friction elements used in such clutches to effect the connection between the driving and driven members. In clutches as now commonly constructed for automobile installation, the fly wheel of the motor is used as the driving member and a friction element mounted on the propeller shaft transmits power thereto by being forced into engagement with a surface on the fly wheel. In most instances the friction element takes the form of a disc carrying a strip or ring of friction material and a presser plate is provided by which this friction ring may be forced into tight contact with the driving surface. The friction material is usually rigidly secured to the disc by rivets or other suitable means, and various materials, such as fibre, woven asbestos, and the like, are used for the friction ring.

This arrangement of the clutch parts is unsatisfactory in service because the disc and the fly wheel are frequently thrown out of alignment due to the severe conditions under which they are operated. The friction material becomes worn in spots and frequent replacements are necessary. This involves the dismantling of the clutch and the removal and replacement of the friction ring. This is a costly and laborious operation and adds materially to the maintenance of the car. Also, dirt or grit frequently becomes lodged between the surface of the friction element and the co-acting surface on the fly wheel, thus causing damage to the relatively soft friction element so that it wears rapidly.

The object of the present invention is to provide a friction element for use in a clutch which affords numerous advantages over those heretofore in common use, in that the friction material is without internal support throughout the greater portion of its extent and is thus flexible and yielding. With this element, the cost of manufacture and maintenance of the clutch is reduced since the amount of accurate machining of clutch parts heretofore required is substantially reduced and the friction element has a longer life. The element is further constructed in such manner that there is no rigid mechanical connection between the friction material and the parts on which it is mounted, and the material thus serves as a heat insulator between the driver member and the structure on which the material is mounted. Since there are no connecting means, such as rivets, passing through the friction material and into the support on which the material is mounted, the material also assists in absorbing vibration generated in the motor, which in present clutches is transmitted through the element to the drive mechanism of the vehicle.

The friction element comprises a ring of friction material mounted on the ends of spokes or other supporting members, by which the ring is mounted on the usual hub. The friction ring is molded on the spoke ends by the application of heat and pressure and is thus held securely in position. The spoke ends are relatively narrow so that their presence within the body of the ring does not stiffen the latter to any substantial degree, and if desired, the ring may be formed in arcuate sections with overlapping portions between the spoke ends to provide greater flexibility.

For a better understanding of the invention, reference may be had to the accompanying drawings, in which Fig. 1 is a face view partly in section illustrating one embodiment of the invention;

Fig. 2 is a fragmentary face view of a modification; and

Figs. 3 and 4 are edge views illustrating different stages in the manufacture.

Referring to the drawings, the new friction element is illustrated in Fig. 1 as including a ring 10 of molded friction material mounted on the ends of spokes 11, the ends of the spokes entering the ring and lying between the opposite faces thereof. Preferably and as a matter of convenience, the ring is made up of two pieces and pockets of suitable size and shape to receive the spoke ends are formed in the inner faces of the two parts by a suitable operation. Thereafter, the two parts of the ring are placed against the faces of the spoke ends, and the unit is processed by heat and pressure to cause the friction material to grip the spoke ends tightly. In this operation, the two parts of the ring unite except at the spoke ends. If desired, more material may be removed from the parts of the ring than is required to form the recesses for the spokes, in which event, depressions 12 are formed in the surfaces of the ring adjacent the spoke ends during the processing. These radial channels in the friction surface render the ring self-cleaning to a substantial degree.

The ends of the spokes entering the body of friction material are relatively narrow so that for the major portion of its extent, the ring is not reinforced by metal. In the standard disc construction now in use, the friction rings are applied to opposite faces of the disc at its periphery so that the friction material is rigid and unyielding except on application of a force sufficient to distort the disc itself. In the construction of this application, the friction material is not supported from within between the spoke ends and the flexibility of the ring may be further increased by making the ends of the spokes narrower than the other parts thereof. As illustrated, each spoke may terminate in a portion of reduced width defined by shoulders 13, the end thus being narrower than the remainder of the spoke. The shoulders serve the further purpose of a gauge to indicate the proper positioning of the spokes in the ring, the spokes being inserted into the pockets in the parts of the ring until the shoulders lie close to the inner edge of the ring.

A modified construction is shown in Figs. 2, 3 and 4. Here, the spokes have bifurcated ends 14 entering the friction ring and the latter is made up of a plurality of arcuate sections 15 having overlapping ends 16. In the production of the elements illustrated in these figures, the ring used is made of two main parts and each part is cut into a plurality of arcuate sections by division lines 17 between the sections of one part of the ring extending across the division lines 18 of the other part of the ring. The sections of two parts of the ring are applied to opposite faces of the spoke ends and some material, such as stearin, is inserted between the overlapping portions of the two parts of the ring and also between the ends of the sections. When the ring is then processed by the application of heat and pressure, the sections which lie against opposite faces of each spoke end become united, as indicated at 15' while the overlapping portions of adjacent sections are not united due to the presence of the stearin between them in the processing operation. With this form of the ring, it will be apparent that greater flexibility is obtained since the complete ring is formed of a plurality of sections, each of which is mounted on the end of a spoke and these sections are disconnected between the spoke ends. By providing the overlapping portions for the sections at their ends, the ring is made continuous and may flex at these points without becoming distorted.

With the new ring, it will be observed that while the friction material is mounted firmly on the ends of the spokes, there is no rigid mechanical connection between the friction material and the spoke ends. As a consequence, there is no metallic connection, when the clutch is engaged, between the fly wheel and the spoke structure. The interposition of the friction material between the metallic spokes and the fly wheel results in a substantial reduction in the amount of heat that is transmitted to the spoke structure and also the transmission of vibration is substantially reduced. As is well known, automobile motors and the like generate periodic torsional vibration at different speeds and this vibration is transmitted from the motor through the clutch to the drive mechanism resulting in strain on the parts and vibration which is unpleasant to the occupants of the vehicle. With the present construction in which friction material only comes into contact with the driving member of the clutch, such periodic vibration is substantially absorbed and prevented from passing to the driving parts.

This application is a continuation in part of my Patent No. 1,754,233, issued April 15, 1930.

What I claim is:

1. A friction element comprising a structure including a plurality of spokes, and a ring-shaped disc of friction material molded on the ends of said spokes, the spoke ends within the friction disc being of reduced width.

2. A friction element comprising a structure including a plurality of spokes having ends of reduced width, and a ring of friction material molded on the ends of the spokes, the width of each spoke end embedded in the material being less than the distance between adjacent spoke ends along the ring.

3. A friction element comprising a structure including a plurality of spokes having ends of reduced width, and a ring of friction material molded on the ends of the spokes, the aggregate area of the ring within which said spoke ends are received being less than half the total area of the ring.

4. A friction element comprising a structure including a plurality of radial spokes having free ends of reduced width, and a ring of friction material molded on the free ends of said spokes, the portions of said spokes lying enclosed in the friction material having a width not greater than the width of the spokes elsewhere.

5. A friction element, comprising a supporting structure including a plurality of spokes, each spoke having an end of reduced width defined in part by shoulders, and a ring of friction material molded with spoke ends, the inner periphery of said ring lying in contact with the shoulders of said spokes.

6. A friction element comprising a structure including a plurality of spokes, and a ring of friction material molded on the ends of said spokes, said ring having spaced portions of reduced thickness dividing the working surfaces of said ring into a plurality of sections.

7. A friction element comprising a supporting structure including a plurality of spokes, and a ring of friction material molded on the free ends of said spokes, said ring having a plurality of radial depressions in its opposite faces adjacent said spoke ends.

8. A friction element comprising a supporting structure including a plurality of spaced radial projections having ends of reduced width, and a ring of friction material moulded on said ends of said projections and extending in a self-supporting arc between said projections, the width of the ends of said projections being less than the spaces between them.

9. A friction element comprising a structure including a plurality of spokes, reduced extensions on the ends of said spokes forming a shoulder on the spokes, and a ring of friction material moulded on said extensions and abutting the shoulders on said spokes at its inner periphery.

10. A friction element comprising a structure including a plurality of spokes, having flat ends of reduced width, and a ring of friction material moulded on the reduced flat ends of said spokes and extending over the tips thereof, whereby the tips of the spokes lie within the outer periphery of said ring.

11. A friction element comprising a supporting structure including a plurality of spaced projections, and a ring of friction material molded on the projections, said ring having a plurality of depressions in at least one of its faces opposite said projections.

12. A friction element comprising a structure including a plurality of spokes, the width of the free end of each spoke not exceeding the width of the spoke elsewhere, and a ring of friction material molded on the ends of the spokes and extending in a self-supporting arc between the said ends of the spokes.

13. A friction element comprising a supporting structure including a plurality of flat spokes, and a ring of friction material molded on the free ends of the spokes, the flat area of the spokes in contact with the friction material being less than the flat area of the spokes elsewhere.

In testimony whereof I affix my signature.

WILLIAM C. FISHER.